L. H. Mealey,
Knife.
Nº 80,197.    Patented July 21, 1868.
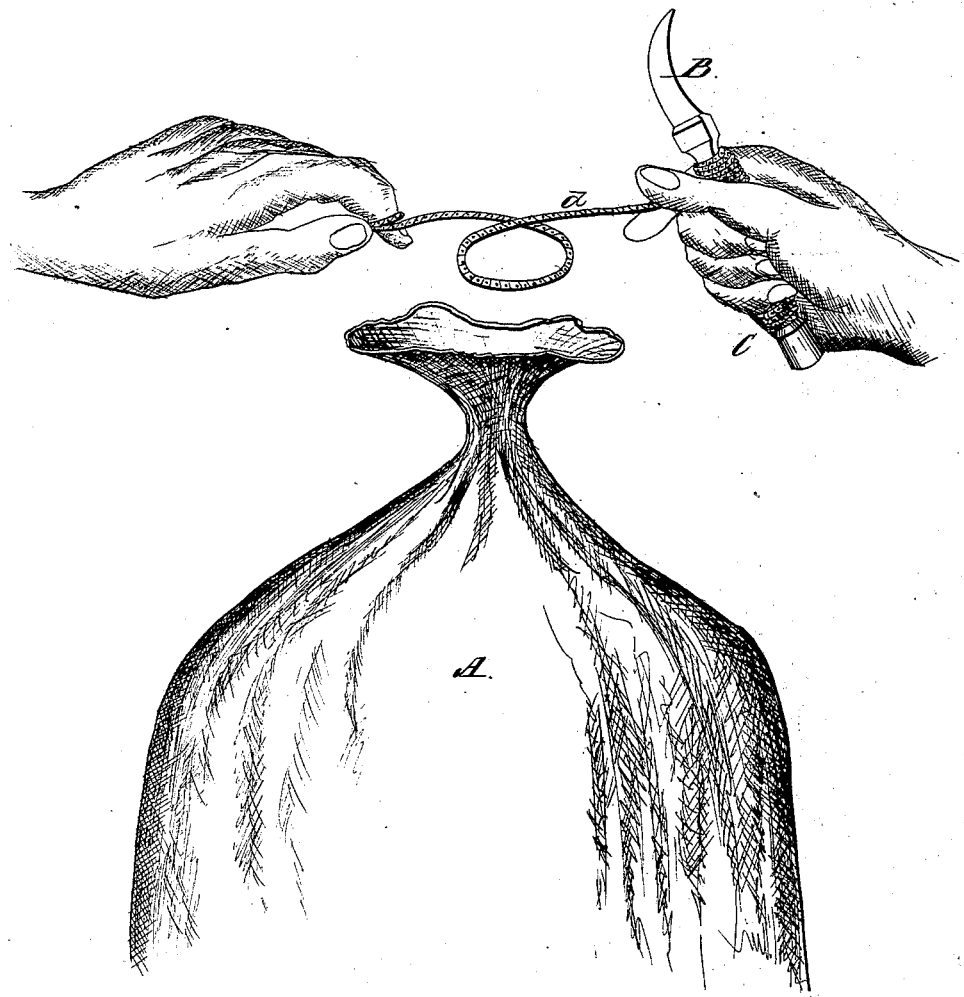
Witnesses:
J. H. Harbine
B. F. Harbine
Inventor:
Lewis H. Mealey

United States Patent Office.

LEWIS H. MEALEY, OF ALPHA, OHIO.

*Letters Patent No. 80,197, dated July 21, 1868.*

IMPROVEMENT IN PAPER-SACK KNIVES.

*The Schedule referred to in these Letters Patent and making part of the same.*

TO ALL WHOM IT MAY CONCERN:

Be it known that I, LEWIS H. MEALEY, of Alpha, in the county of Greene, and State of Ohio, have invented certain new and useful Improvements for Tying Paper or other Sacks, of which the following is a full, clear, and exact description, reference being had to the accompanying drawing, which makes part of this specification, and which represents a view of a sack with my improvements attached.

The object of my invention is to facilitate the operation of tying paper sacks, by economizing the amount of cord used, and preventing injury to the hand of the operator, to which end my improvement consists in providing a knife, having a spool or bobbin-shaped handle, upon which the cord is wound, and using the same to receive the tension of the cord in forming the knot, as well as to sever the same after the knot is made, thereby preventing the fingers of the operator from being injured by the pressure of the cord, and economizing the amount of the same used, and enabling the operation to be performed with much greater rapidity than by the ordinary method.

In the accompanying drawings, A represents a sack or bag, the mouth of which is to be tied, and *a* the cord used for that purpose, which is wound upon the spool or bobbin-shaped handle C, to which a blade, B, is attached.

A sufficient length of cord is to be wound upon the handle to tie a considerable number of sacks, say, one hundred.

In using this device, the end of the cord is held between the first finger and thumb of the left hand, in proper position upon the mouth of the sack to be tied, and the cord passed twice around it by the right hand, in which the knife is held, and drawn as tight as necessary for fastening, the tension of the cord being received by the handle C, thus relieving the fingers from pressure. After the knot is tied, the cord is severed, without waste, by the blade B.

By this device, at least one-half of the cord ordinarily used is economized, and the operation of tying performed with ease and rapidity.

What I claim, and desire to secure by Letters Patent, is—

The within-described device, consisting of a bobbin or spool-formed handle, C, upon which the cord is wound, in combination with a cutting-blade, B, operating in the manner described.

., LEWIS H. MEALEY.

Witnesses:
 JACOB HARNER,
 A. H. BAKER.